US007414974B2

United States Patent
Kim

(10) Patent No.: US 7,414,974 B2
(45) Date of Patent: Aug. 19, 2008

(54) TRANSMISSION CONTROL APPARATUS AND METHOD FOR TCP/IP SUITE

(75) Inventor: Young Lak Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1075 days.

(21) Appl. No.: 10/233,437

(22) Filed: Sep. 4, 2002

(65) Prior Publication Data
US 2003/0112806 A1 Jun. 19, 2003

(30) Foreign Application Priority Data
Sep. 17, 2001 (KR) .............................. 2001-57291

(51) Int. Cl.
*G06F 11/00* (2006.01)
(52) U.S. Cl. ...................................... 370/236; 370/394
(58) Field of Classification Search ............ 370/395.52, 370/394, 236
See application file for complete search history.

(56) References Cited

U.S. PATENT DOCUMENTS

| 6,377,782 | B1 * | 4/2002 | Bishop et al. ............... 455/3.01 |
| 6,519,223 | B1 * | 2/2003 | Wager et al. ................. 370/216 |
| 6,831,898 | B1 * | 12/2004 | Edsall et al. ................. 370/256 |
| 6,888,792 | B2 * | 5/2005 | Gronke ....................... 370/227 |
| 6,928,587 | B2 * | 8/2005 | Gernhardt .................... 714/39 |
| 6,970,457 | B1 * | 11/2005 | Richards et al. ............. 370/382 |
| 7,058,027 | B1 * | 6/2006 | Alessi et al. ............. 370/310.1 |
| 2003/0174662 | A1 * | 9/2003 | Malkamaki ................. 370/310 |

FOREIGN PATENT DOCUMENTS

KR 2000-0024947 5/2000

OTHER PUBLICATIONS

English Translation of a Chinese Office Action is enclosed for the Examiner's information. Date of Action: Apr. 2, 2004.

* cited by examiner

*Primary Examiner*—Ricky Ngo
*Assistant Examiner*—Chandrahas Patel
(74) *Attorney, Agent, or Firm*—Ked & Associates, LLP

(57) ABSTRACT

A transmission control apparatus of the present invention includes a reliable service unit for providing reliable peer-to-peer data communication at layer 2 of a TCP/IP stack, and a setup unit for setting the reliable service unit. The reliable service unit includes a fragmentation part for fragmenting a service data unit (SDU) from an upper layer into protocol data units (PDUs) of a predetermined length, a sending buffer for temporarily storing the PDUs from the fragmentation part, a receiving buffer for temporarily storing PDUs received through a communication channel, a reassemble part for assembling the PDUs stored in the receiving buffer to a SDU of the upper layer, a poller for controlling data transmission/reception by checking network conditions, and a control unit for controlling at least one of the fragmentation part, sending buffer, receiving buffer, reassemble part, and poller. A transmission control method of the present invention includes initializing reliable peer-to-peer data communication at layer 2 of a TCP/IP stack, registering ports of the transmission control apparatus and devices to be connected to the ports, determining whether there is an upper layer SDU to be sent, transmitting the upper layer SDU, determining whether there are lower layer PDUs to be received when no upper layer SDU exists to be transmitted, and receiving the lower layer PDU if there are lower layer PDUs to be received.

22 Claims, 8 Drawing Sheets

TRANSMISSION CONTROL APPARATUS AND METHOD FOR TCP/IP SUITE

BACKGROUND OF THE INVENTION

1. Field of the Invention

The present invention relates to a transmission control protocol/internet protocol (TCP/IP), and in particular to a transmission control apparatus and method employed to a data link layer of a TCP/IP suite.

2. Background of the Related Art

The Internet protocols are the most popular open network protocol suite because they can be used to communicate across any set of interconnected networks and are well suited for LAN and WAN communications. The Internet protocols consist of a suite of communication protocols, of which the two best known are the Transmission Control Protocol (TCP) and the Internet Protocol (IP).

IP is a network layer (layer 3 of the 081 reference model) protocol that contains addressing information and some control information that enables packets to be routed. Also, IP provides connectionless and best-effort delivery of packets through an internetwork, and provides fragmentation and reassembly of the packets to support data links.

TCP is a transport layer (layer 4 of the 081 reference model) protocol that provides reliable transmission of data in an IP environment. More specifically, TCP offers reliability by providing connection-oriented, end-to-end reliable packet delivery through an internetwork and offers efficient flow control, which means that when sending acknowledgments back to the source, the receiving TCP process indicates the highest sequence number it can receive without overflowing its internal buffers.

In the TCP/IP model, however, functions of the network access layer at the bottom of the protocol TCP/IP stack corresponding the data link (layer 2) and physical layers (layer 1) of the OSI reference model are not specified, such that it is difficult to expect reliable transfer of data across physical media.

SUMMARY OF THE INVENTION

An object of the invention is to solve at least the above problems and/or disadvantages and to provide at least the advantages described hereinafter.

It is an object of the present invention to provide a transmission control apparatus and method which controls data transmission in the network access layer of the TCP/IP stack by implementing a Reliable Protocol Layer 2 (RPL2) therein.

It is another object of the present invention to provide a transmission control apparatus and method which controls a plurality of devices based on data transmission reliability at the data link layer.

To achieve these and other objects, the transmission control apparatus of the present invention comprises a reliable service unit which provides reliable peer-to-peer data communication at a predetermined layer (e.g., layer 2) of the TCP/IP stack and a setup unit for setting the reliable service unit.

The reliable service unit includes a fragmentation part for fragmenting a service data unit (SDU) from an upper layer into protocol data units (PDUs) of a predetermined length, a sending buffer for temporarily storing the PDUs from the fragmentation part, a receiving buffer for temporarily storing PDUs received through a communication channel, a reassemble part for assembling the PDUs stored in the receiving buffer to a SDU of the upper layer, a poller for controlling data transmission/reception by checking network conditions, and a control unit for controlling the fragmentation part, sending buffer, receiving buffer, reassemble part, and poller.

A transmission control method in accordance with the present invention comprises initializing reliable peer-to-peer data communication at a predetermined layer (e.g., layer 2) of a TCP/IP stack, registering ports of the transmission control apparatus and devices to be connected to the ports, determining whether there is an upper layer SDU to be sent, transmitting the upper layer SDU in case there is an upper layer SDU to be sent, determining whether there are lower layer PDUs to be received in case there is no upper layer SDU to be transmitted, and receiving the lower layer PDU if there are the lower layer PDU to be received.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will be described hereinafter with reference to the accompanying drawings.

Figure 1:
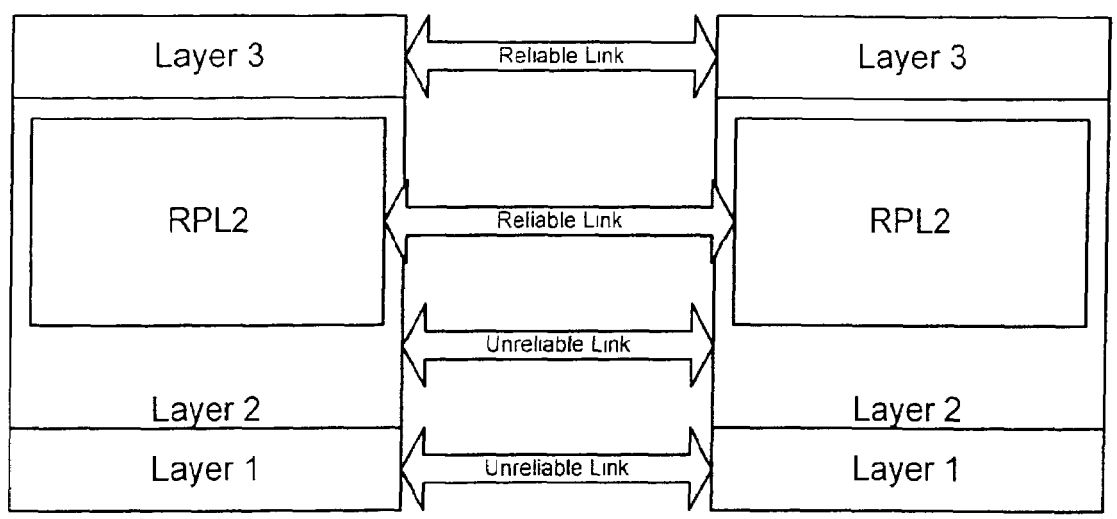
FIG. 1 is a conceptual view illustrating a protocol stack adapted a RPL2 of the present invention.

FIG. 1 is a conceptual view illustrating a protocol stack adapted to include an RPL2 according to one embodiment of the present invention.

As shown, the protocol stack includes first, second, and third protocol layers, and the RPL2 layer which is preferably positioned in the second protocol layer. The RPL2 guarantees that data reaches the receiver even if the data is transmitted through an unreliable channel. In other words, reliable data transmission is guaranteed by applying the reliable service of the data link layer which is defined in the OSI reference model to the network access layer of the TCP/IP model.

In order to secure reliable data transmission in the data link layer, the RPL2 provides fragmentation and reassembling functions for the upper layer data unit and adopts GO-Back-N ARQ and sliding window algorithms for error control and flow control. To detect errors, a CRC16 can be optionally employed.

Figure 2:
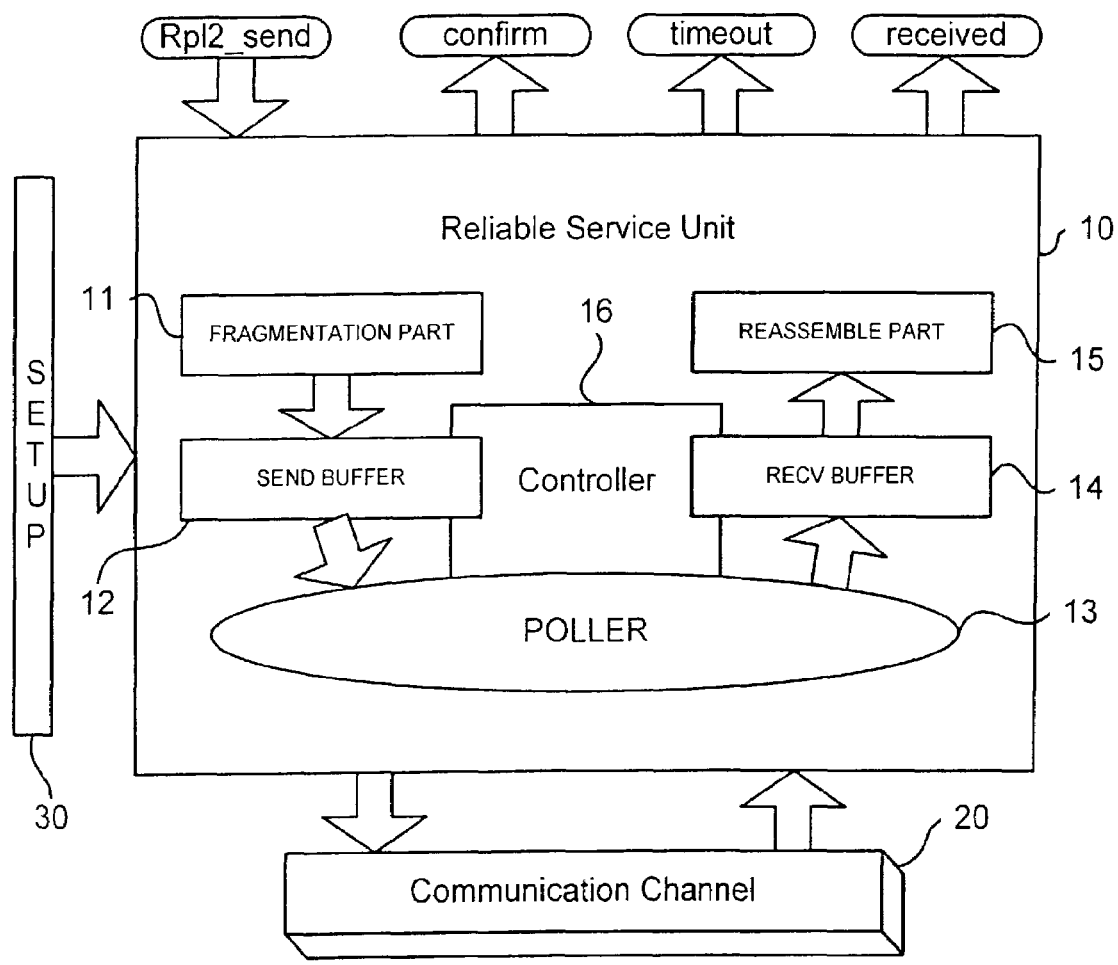
FIG. 2 is a block diagram illustrating a transmission control apparatus of the present invention.

FIG. 2 is a block diagram illustrating a transmission control apparatus according to an embodiment of the present invention. As shown, the transmission control apparatus includes a reliable service unit 10 for reliable peer-to-peer data communication at a layer 2 and a setup part 30 for setting the ports of the reliable service unit 10 and devices that are connected to the ports. The transmission control apparatus is connected to other network equipments through a communication channel 20.

The reliable service unit 10 includes a fragmentation part 11 for fragmenting a service data unit (hereinafter, an SDU) from an upper layer into protocol data units (PDU) of a predetermined length, a sending buffer 12 for temporarily storing the PDUs from the fragmentation part 11, a receiving buffer 14 for temporarily storing data received through the communication channel 20, a reassemble part 15 for assembling the data stored in the receiving buffer so as to form an SDU of the upper layer, a poller 13 for controlling data transmission by checking network conditions, and a control unit 16 for controlling the above components.

The RPL2 registers a number of ports which corresponds to a number of data links to be required, and logically establishes point-to-point channels to the respective ports for providing respective services to the upper layer through the channels. Since the respective ports are independently managed, each upper layer entity communicates with a lower layer entity with different transmission characteristics through a corresponding port.

The RPL2 guarantees reliable data transmission using the sliding window mechanism. To achieve this, the RPL2 of the sender fragments the upper layer data into PDUs of predetermined size using the fragmentation part when data is received from the upper layer, temporarily stores the PDUs in the sending buffer 12, and then transmits data through the sliding window mechanism of the poller 13. The PDUs stored in the sending buffer 12 are sent in correspondence with a window size and then the window slide if an acknowledgment (ACK) is received from the receiver such that the next PDUs are sent. On the other hand, the RPL2 of the receiver stores the PDUs in the receiving buffer 14 and checks sequence numbers of the received PDUs. If there is a missing number among the received PDUs, the RPL2 of the receiver requests retransmission of the missing PDU to the sender and reassembles the PDUs so as to restore the upper layer SDU at the reassemble part 15 in case all the PDUs are normally received.

In FIG. 2, "rpl2_send" is a function call for requesting data transmission from the upper layer, "confirm" is a signal notifying the upper layer that the reliable service was normally performed, "timeout" is a signal for notifying the upper layer that data transmission failed, and "received" is a signal for sending the normally received data to the upper layer using the callback function after reassembling the data.

Figure 3:
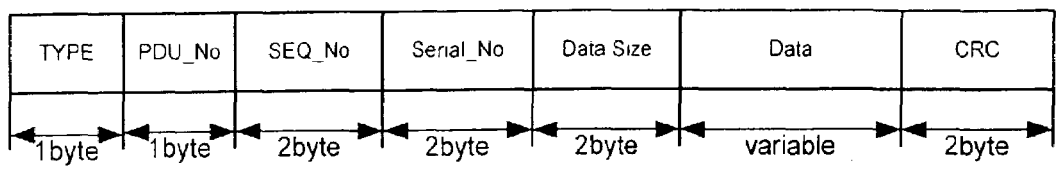
FIG. 3 shows a PDU format used in the present invention.

FIG. 3 shows one type of a PDU format which may be used according to the present invention. As shown, a PDU in accordance with the present invention may include a TYPE field of 1 byte, a PDU_No field of 1 byte, a SEQ_No field of 2 bytes, a Serial_No field of 2 bytes, a Data size field of 2 bytes, a data field of a variable length, and a CRC field of 2 bytes. The Type field indicates a type of the PDU, the PDU_No field indicates a number of the PDUs included in the upper layer SDU, the SEQ_No field indicates a sequence number of the PDU, the Serial No. field indicates a serial number of the SDU, the Data size field indicates a length of a payload which is inserted in the data field, and the data field indicates the payload of the upper layer that is transmitted in the form of the PDU.

Figure 4:
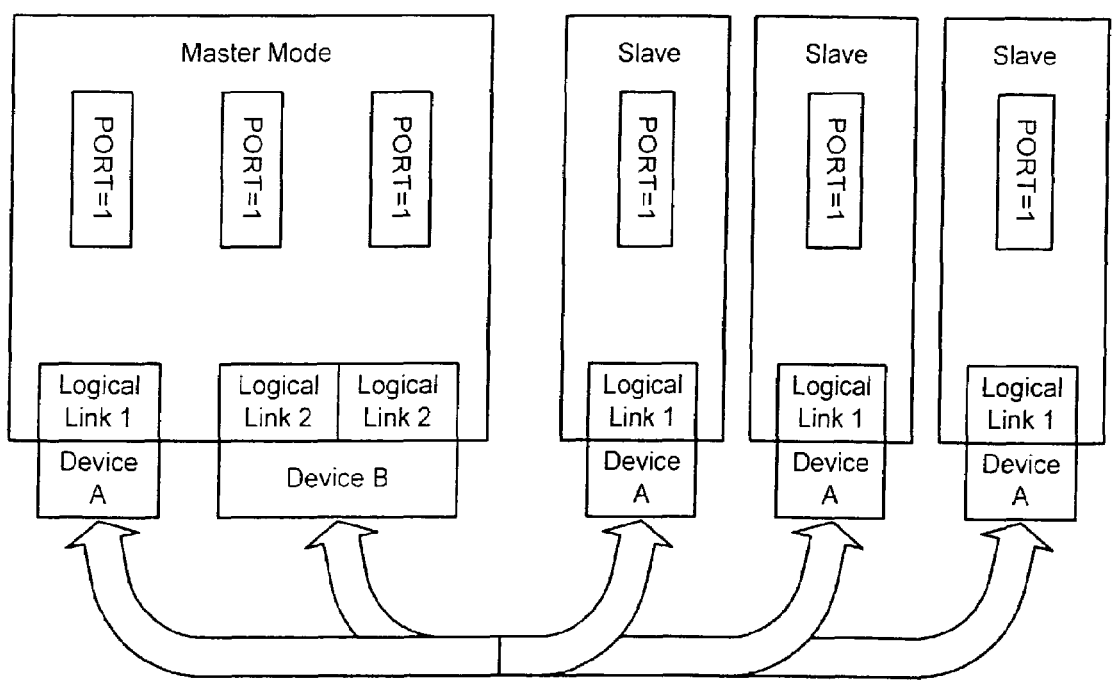
FIG. 4 is a conceptual view illustrating a device registration process in the transmission control apparatus of FIG. 2.

FIG. 4 is a conceptual view illustrating a device registration process which may be implemented in the transmission control apparatus of FIG. 2. Since a reliable service to the upper layer in the data link layer is guaranteed, the ports and devices that are correspondingly connected to the ports can be registered at the data link layer.

Port registration is manually performed by the user through the setup unit 30. Port registration information includes a port ID, a device ID, a logical link number of the device, a window size, a maximum SDU size of the upper layer, a callback function defined at the upper layer. Device registration information includes a device ID, a maximum PDU size of the lower layer, and a transmission function pointer of the device.

<Port Registration Table>

| Port ID | Device | Logical Link | Send Buffer | Recv Buffer | Buff, Win Management | Callback | Upper layer MFL | Win Size |
|---|---|---|---|---|---|---|---|---|
| 1 | A | 1 | S_buff1 | R_buff1 | Buff, Win Management | Callback | 1500 | 64 |
| 2 | B | 1 | S_buff2 | R_buff2 | Buff, Win Management | Callback | 1024 | 128 |
| 3 | B | 1 | S_buff3 | R_buff3 | Buff,Win Management | Callback | 2048 | 128 |

<Device Registration Table>

| Device ID | Lower Layer send func | Lower Layer Recv fund | Lower Layer MFL | Recv_buff free func |
|---|---|---|---|---|
| 1 | Send1 | Recv1 | 256 | Free |
| 2 | Send2 | Recv2 | 512 | Free |

As shown in FIG. 4, one device is registered for one port in the port registration process, and it is possible that one device occupies two ports (refer to the port registration table).

In FIG. 2, the fragmentation unit 11 fragments the upper layer SDU into PDUs so that the device of the lower layer can process the data to be delivered from the upper layer to the lower layer. The PDUs inherit the same serial number of the SDU and are stored in the sending buffer and then transmitted through the device driver. The serial number is managed by each application and can be assigned up to a predetermined number, e.g., up to 32766. When the serial number reaches the predetermined number, (e.g., 32766), it begins from 0 again.

In the receiving procedure, the poller checks the serial numbers of the received PDUs for judging whether the PDUs originated from the same SDU and placing the PDUs in the receiving buffer, after removing the RPL2 header, until a complete SDU has been received if the serial numbers of the PDUs are identical. Once the complete SDU has been received, the associated PDUs are reassembled at the reassemble part 15 and delivered to the upper layer. Simultaneously, the pointer and the size of the receiving buffer is reported to the upper layer such that a new receiving buffer is assigned from the upper layer for receiving the next PDU.

The sending buffer 12 is assigned to a correspondingly registered port in a size that is a certain number and preferably 64 times longer than the Maximum Frame Length (hereinafter, as MFL) of the PDU, so as to store the data fragmented into the MFL size of the lower layer PDU from the upper layer SDU. Data stored in the sending buffer are read and transmitted as large as the window size and then next data to be transmitted are stored in the buffer.

The receiving buffer 14 is assigned to a correspondingly registered port in a size that is as long as the MFL of the upper layer SDU, so as to store the PDUs until a complete upper layer SDU has been received. Once enough PDUs equal to a complete upper layer SDU have been received, the PDUs are reassembled by the reassemble part 15 and delivered to the upper layer. If the PDUs are read by the upper layer application, the receiving buffer 14 is freed up.

The window size is defined to be appropriate to the registered device performance during the port registration procedure by the user, such that the sender of the transmission control apparatus can send PDUs as large as the window size before receiving an ACK from the receiver. When the ACK arrives from the receiver, the window moves as many as the number of the received PDUs.

Figure 5:
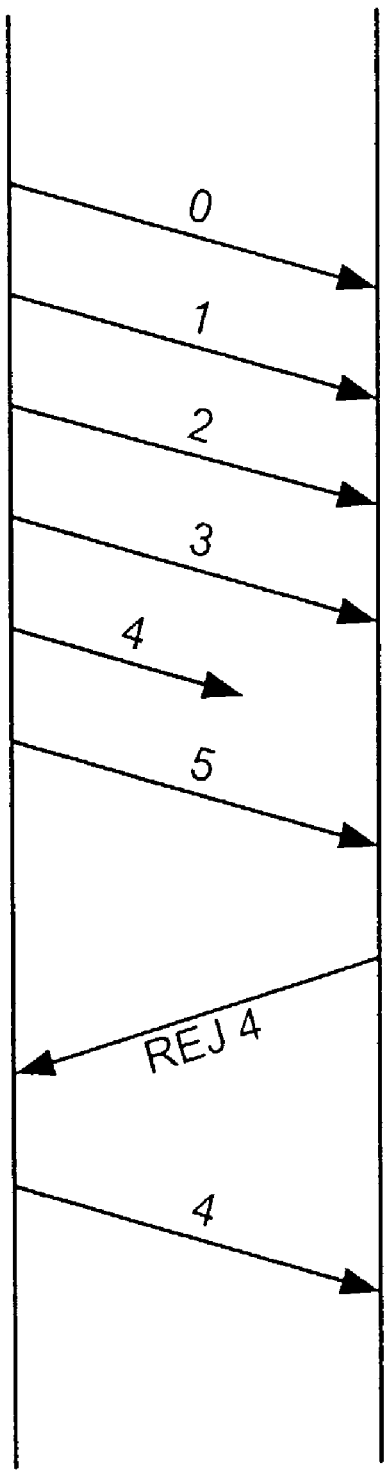
FIG. 5 is a message sequence chart for illustrating a retransmission procedure when there is a transmission data loss.

FIG. 5 is a message sequence chart for illustrating a retransmission procedure which may be implemented by the invention when data loss occurs. As shown, in case that PDU4 is lost while the sender transmits the PDUs as many as the window size, the receiver checks the sequence numbers of the PDUs and recognizes that PDU4 has been missed. When this occurs, the receiver requests retransmission of PDU4 by sending a REJ4 signal to the sender. Upon receiving the REJ4 signal, the receiver retransmits PDU4. Retransmission of the missing PDU repeats a predetermined time if necessary, and a transmission error message is delivered to the upper layer if a retransmission count ends.

Figure 6:
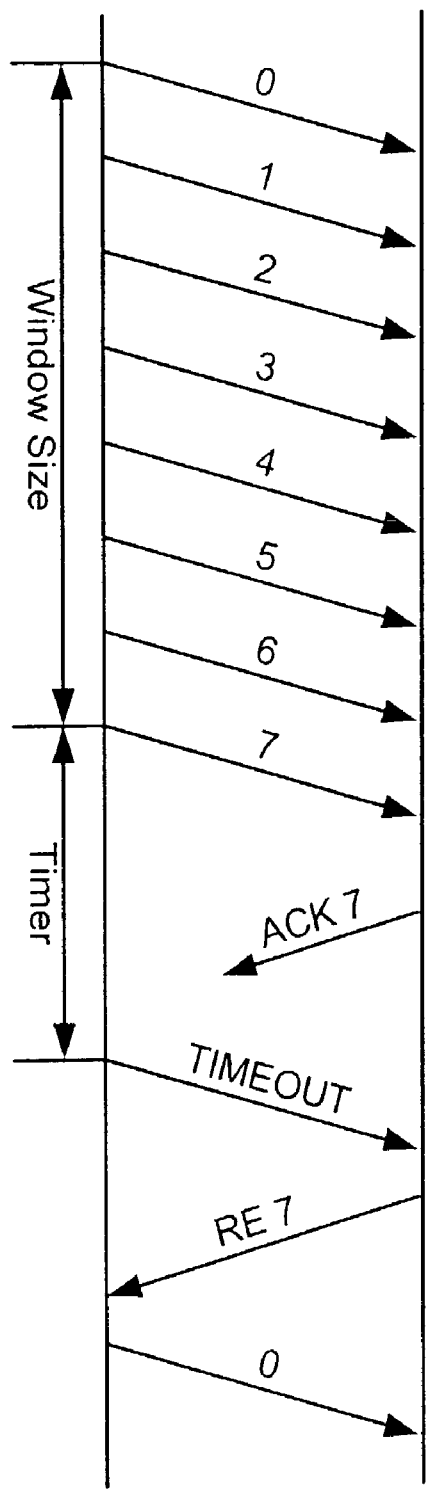
FIG. 6 is a message sequence chart for illustrating a retransmission procedure when an ACK is not received from a receiving terminal.

FIG. 6 is a message sequence chart for illustrating a retransmission procedure which may be implemented by the present invention when an ACK is lost. As shown, the sender transmits a number of PDUs which corresponds to a window size and waits for the ACK from the receiver for a predetermined period. If the ACK is not received within the predetermined period, a time out (TO) signal is sent to the receiver and a TO timer is operated. Upon receiving the TO signal, the receiver reports a PDU number to be received using a Receive Expect (RE) PDU. The sender then retransmits data corresponding to the PDU having the PDU number reported by the RE PDU. The TO signal is repeatedly transmitted a predetermined number of times (e.g., up to 5 times), and it is reported that the data link was broken if there is no answer to the fifth TO signal. The timer and retransmission counter is managed per each port.

The data transmission control method in accordance with the present invention will be described with reference to FIG. 6 to FIG. 8.

Figure 7:
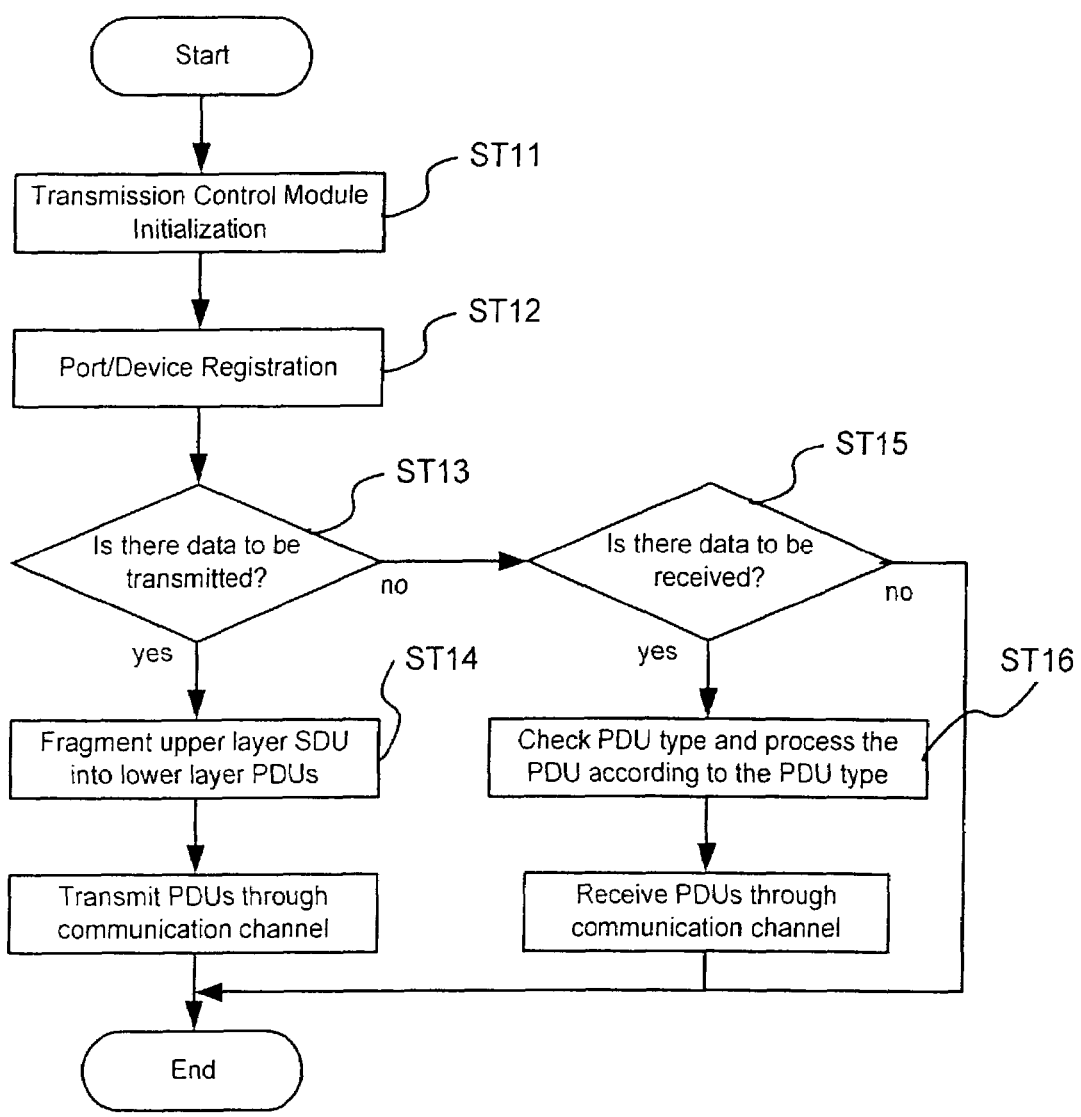
FIG. 7 is a flow chart illustrating a data transmission control method of the present invention.

FIG. 7 is a flow chart illustrating the data transmission control method of the present invention included as an initial step.

Initializing the transmission control apparatus of the present invention at step ST11, and then registering the ports of the transmission control apparatus and devices to be connected to the ports through the setup unit 30 at step ST12. After the port and device registration, the transmission control apparatus determines whether data exists to be transmitted at step ST13. If data exists to be transmitted, the data is fragmented into the lower layer PDUs having a maximum PDU size and then are transmitted at step ST14. On the other hand, if no data exists to be transmitted, the transmission control apparatus determines whether data exists to be received at step ST15. If data exists to be received, the transmission control apparatus checks a type of the PDUs included in the data and performs a process according to the PDU type at step ST16.

Figure 8:
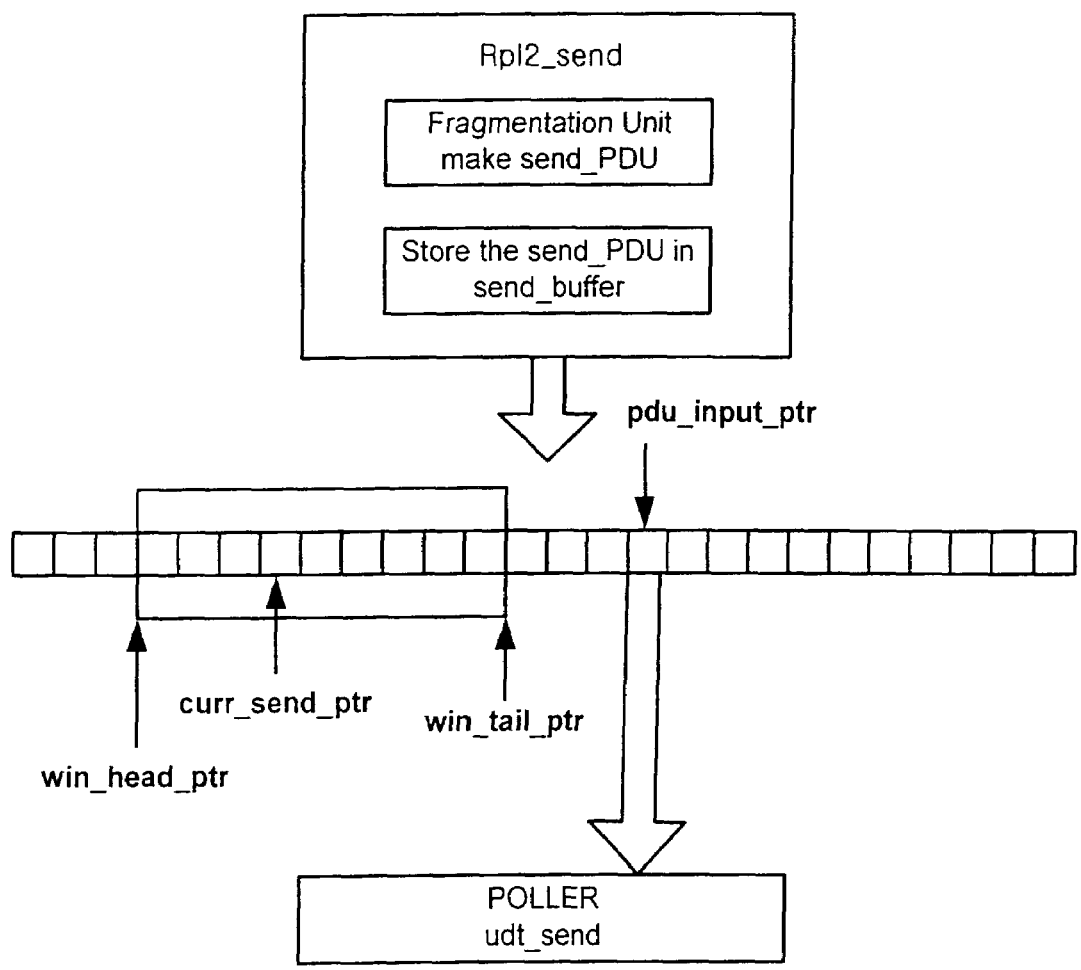
FIG. 8 is a conceptual view illustrating a transmission procedure in the data transmission control method of FIG. 7.

FIG. 8 is a conceptual view illustrating the data transmission procedure of the data transmission control method of FIG. 7 in more detail. As shown, when the data to be transmitted are delivered from the upper layer, the upper layer data are fragmented into the lower layer PDUs having a predetermined size by the fragmentation unit 11 and then are stored in the sending buffer 12. The data stored in the sending buffer are transmitted by the poller 13 using the lower layer sending function.

As long as the REJ signal is not received from the receiver, the sender transmits the data in an amount which preferably corresponds to the window size and waits for an ACK from the receiver while activating the timer. If the sender does not receive the ACK signal from the receiver within a predetermine time, the timer times out and sends a timeout signal to the receiver. The timeout signal is repeated predetermined times (for instance, 3 times) whenever the timer times out, and if the sender does not receive the ACK from the receiver even if the timeout signal is transmitted predetermined times, a timeout event is generated by sending a callback signal to the upper layer. On the other hand, if the ACK signal is normally arrived from the receiver, the upper layer generates a check event through callback and sends the next data appropriate for the window.

Figure 9:
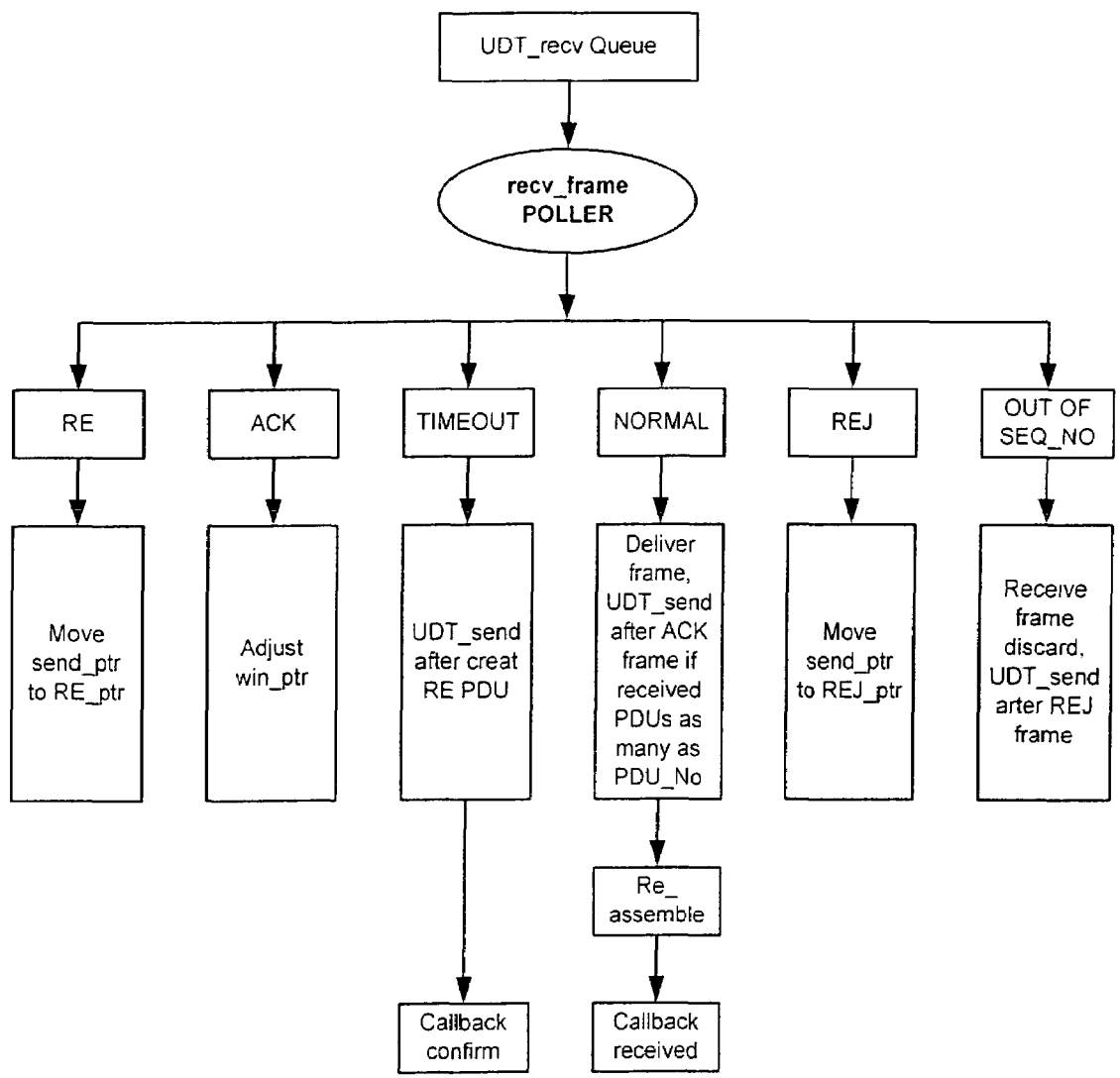
FIG. 9 is a conceptual view illustrating a reception procedure in the data transmission control method of FIG. 7.

FIG. 9 is a conceptual view illustrating a data reception procedure which may be implemented by the data transmission control method of FIG. 7. As shown, when a PDU is received through the communication channel 20, the control unit 16 checks the type field of the PDU header and performs an appropriate procedure for the PDU type. Also, the control unit 16 checks a SEQ_No of the received PDU and discards the received PDU in the case where the SEQ_No is not expected. Retransmission of the missing PDU is then requested by reporting the SEQ_No using the RE PDU. The successfully received PDUs are sent to the reassemble unit 10 of the receiver, where they are reassembled in order to be recovered as an original upper layer SDU. The upper layer SDU is sent to the upper layer together with the pointer and size of the data for the callback function.

In summary, the data transmission control apparatus and method of the present invention are preferably applied to the data link layer of a TCP/IP stack, in which GO-Back-N ARQ and sliding window algorithms are employed for respective error and flow controls, in order to implement reliable transmission service, for example, at layer 2. Also, because the data transmission control apparatus and method of the present invention supports reliable data transmission at layer 2, it is possible to manage the devices at data link layer level.

While this invention has been described in connection with what is presently considered to be practical and preferred embodiments, it is to be understood that the invention is not limited to the disclosed embodiments. On the contrary, the present application is intended to cover various modifications and equivalent arrangements included within the spirit and scope of the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A transmission control apparatus in a communication network having a sending terminal (sender) and a receiving terminal (receiver), comprising:
    a reliable service unit which provides reliable peer-to-peer data communication between upper and lower layers through a layer 2 of a TCP/IP stack; and
    a setup unit for setting the reliable service unit, wherein the setup unit registers a number of ports of the reliable service unit and registers a number of devices to be connected to corresponding ones of the ports, the setup unit independently managing registration of the ports and devices in a data link layer which is included in or corresponds to said layer 2 of the TCP/IP stack, wherein information for registering the ports includes a port ID, a device ID, a logical link number of the device, a window size, a maximum service data unit (SDU) size of an upper layer, and a call-back function defined at the upper layer.

2. The transmission control apparatus of claim 1, wherein the setup unit independently manages registration of the ports based on manually input information received from a user.

3. The transmission control apparatus of claim 1, wherein the reliable service unit includes:
    a fragmentation part for fragmenting a service data unit (SDU) from an upper layer into protocol data units (PDUs) of a predetermined length;
    a sending buffer for temporarily storing the PDUs from the fragmentation part;
    a receiving buffer for temporarily storing PDUs received through a communication channel;
    a reassemble part for assembling the PDUs stored in the receiving buffer into an SDU of the upper layer;
    a poller which controls data transmission/reception based on network conditions; and
    a control unit which controls at least one of the fragmentation part, sending buffer, receiving buffer, reassemble part, and poller.

4. The transmission control apparatus of claim 3, wherein each of the PDUs includes type, PDU_No, SEQ_No, Serial_No, Data Size, Data, and CRC fields.

5. The transmission control apparatus of claim 4, wherein the type field indicates a type of PDU, the PDU_No field indicates a number of PDUs included within an SDU, the SEQ_No field indicates a sequence number of the PDU, the Serial_No field indicates a serial number of the SDU, and the Data Size field indicates a payload length of the Data field.

6. The transmission control apparatus of claim 4, wherein the control unit places the PDUs in the receiving buffer until a complete SDU has been received, if serial numbers of the PDUs are identical to each other based on information in the Serial No field of the received PDUs.

7. The transmission control apparatus of claim 4, wherein the control unit sends a retransmission request signal to the sender requesting retransmission of a missing PDU, said retransmission request signal being sent based on information in the SEQ_No field of a received PDU.

8. The transmission control apparatus of claim 1, wherein information for registering the devices includes a device ID, a maximum PDU size of a lower layer, and a transmission function pointer of the device.

9. The transmission control apparatus of claim 8, further comprising:
    sending buffers for storing PDUs derived from an upper layer SDU,
    wherein the sending buffers are assigned to respectively registered ports in a size that is 64 times longer than a PDU Maximum Frame Length (MFL).

10. The transmission control apparatus of claim 9, further comprising:
    receiving buffers for storing PDUs received through a communications channel, wherein the receiving buffers are assigned to respectively registered ports in a size that is as long as an SDU MFL.

11. The transmission control apparatus of claim 1, wherein the window size indicates a number of PDUs that can be sent before an acknowledgment signal is received from the receiver.

12. A transmission control method in a communication network including a sending terminal (sender) and receiving terminal (receiver), comprising:
    (a) initializing reliable peer-to-peer data communications between upper and lower layers through a layer 2 of a TCP/IP stack;
    (b) setting a reliable service unit which performs said data communications, the reliable service unit including a number of ports and a number of devices to be connected to corresponding ones of the ports;
    (c) registering the number of ports and registering the devices to be connected to corresponding ones of the ports of the reliable service unit, the ports and devices being independently managed in a data link layer which is included in or corresponds to said layer 2 of the TCP/IP stack;
    (d) determining whether there is an upper layer service data unit (SDU) to be sent;
    (e) transmitting the upper layer SDU;
    (f) determining whether there are lower layer PDUs to be received in a case no upper layer SDU exists for transmission; and
    (g) receiving a lower layer PDU if there are lower layer PDUs to be received, wherein, in (c), the ports are registered based on information that includes a port ID, a device ID, a logical link number of the device, a window size, a maximum SDU size of an upper layer, and a call-back function defined at the upper layer.

13. The transmission control method of claim 12, wherein said information includes a device ID, a maximum PDU size of a lower layer, and a transmission function pointer of the device.

14. The transmission control apparatus of claim 13, further comprising:
    storing, in sending buffers, PDUs derived from the upper layer SDU, wherein the sending buffers are assigned to respectively registered ports in a size that is a predetermined number of times longer than a PDU Maximum Frame Length (MFL).

15. The transmission control apparatus of claim 14, wherein said predetermined number of times is 64.

16. The transmission control method of claim 14, further comprising:
   storing, in receiving buffers, PDUs received through a communications channel,
   wherein the receiving buffers are assigned to respectively registered ports in a size that is as long as an SDU MFL.

17. The transmission control method of claim 12, wherein the window size indicates a number of PDUs that can be sent before an acknowledgment signal is received from the receiver.

18. The transmission control method of claim 12, wherein (g) includes:
   (g-1) checking a type field of the received PDU; and
   (g-2) processing the PDU according to a PDU type, as determined in step (g-1).

19. The transmission control method of claim 18, wherein (g-2) includes:
   determining whether an order of the PDUs is correct by checking a SEQ_No field of the PDUs;
   requesting retransmission of a PDU having a correct SEQ_No to the sender in case the order is not correct;
   placing PDUs in a receiving buffer until a number of PDUs which corresponds to a complete SDU has been received;
   reassembling the PDUs into an SDU unit; and
   delivering the reassembled PDUs to the upper layer.

20. The transmission control method of claim 12 wherein (e) includes:
   (e-1) fragmenting the upper layer SDU into lower layer PDUs;
   (e-2) storing the PDUs in a sending buffer; and
   (e-3) transmitting a number of the PDUs which corresponds to a predetermined window size.

21. The transmission control method of claim 20, wherein (e-3) includes: transmitting a number of next PDUs which corresponds to the window size when an ACK message is received from the receiver.

22. The transmission control method of claim 20, wherein (e-3) includes: retransmitting a missing PDU when a Receive Expect (RE) message is received from the receiver.

* * * * *